US007583612B2

(12) United States Patent
Lin (10) Patent No.: US 7,583,612 B2
(45) Date of Patent: Sep. 1, 2009

(54) METHOD FOR PERIODICALLY ACQUIRING THE QOS OF MEDIA STREAM AND SYSTEM THEREOF

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 11/558,619

(22) Filed: Nov. 10, 2006

(65) Prior Publication Data

US 2007/0127509 A1 Jun. 7, 2007

Related U.S. Application Data

(63) Continuation of application No. PCT/CN2005/000958, filed on Jun. 30, 2005.

(30) Foreign Application Priority Data

Jun. 30, 2004 (CN) .................. 2004 1 0062977
Jun. 30, 2004 (CN) .................. 2004 1 0062978

(51) Int. Cl.
*H04J 3/14* (2006.01)
*H04L 12/56* (2006.01)
*H04L 12/28* (2006.01)
(52) U.S. Cl. .................. 370/252; 370/352; 370/401; 370/466; 370/395.21
(58) Field of Classification Search .............. 370/252, 370/352–356, 395.21, 389, 400–469, 224; 709/230–250
See application file for complete search history.

(56) References Cited

U.S. PATENT DOCUMENTS 5,345,500 A 9/1994 Breeden et al.

| | | |
|---|---|---|
| 2002/0049854 A1 | 4/2002 | Cox et al. |
| 2002/0136162 A1 | 9/2002 | Yoshimura et al. |
| 2003/0120773 A1* | 6/2003 | Mueller et al. ............... 709/224 |
| 2008/0002669 A1* | 1/2008 | O'Brien et al. ............. 370/352 |

OTHER PUBLICATIONS

"Telecommunications and Internet Protocol Harmonization Over Networks (TIPHON) Release 3"; ETSI Standards; European Telecommunications Standards Institute; Sophia-Antipo; FR; vol. TIPHON-5, No. V212; Jan. 2002; XP014006057; ISSN: 0000-0001.
"Support for online QoS.-monitoring reporting within H.323 systems" ITU-T Standard in Force (I); International Telecommunication Union; Geneva, CH; No. H4609 11/2; Nov. 29 ,2002; XP017401526.

* cited by examiner

Primary Examiner—Afsar M. Qureshi (57) ABSTRACT

The present invention discloses a method for acquiring media stream Quality of Service (QoS) periodically. The MGC sets an inspect duration during which the MGC periodically acquires the QoS information of the media stream, thereby timely acquiring the QoS information of the media stream and effectively controlling the media stream. Two ways for the MGC periodically acquiring the QoS information are provided. The MG actively submits the QoS information to the MGC and the MG submits the QoS information to the MGC according to the periodic request of the MGC. The embodiment of the present invention provides the capability of adjusting the call microscopic QoS, enhances the real-time quality of evaluating the QoS and that of dynamically adjusting call control strategy, inherits the ability of the original protocol for evaluating the microscopic QoS of the network during a certain period and provides more accurate evaluation.

19 Claims, 4 Drawing Sheets

Figure 1

Prior Art

Figure 2

Prior Art

METHOD FOR PERIODICALLY ACQUIRING THE QOS OF MEDIA STREAM AND SYSTEM THEREOF

CROSS-REFERENCE TO RELATED APPLICATIONS

This application is a continuation of International Application No. PCT/CN2005/000958 filed Jun. 30, 2005. This application claims the benefit of Chinese patent application nos. 200410062977.2 filed Jun. 30, 2004 and 200410062978.7 filed Jun. 30, 2004. The disclosures of the above applications are incorporated herein by reference.

FIELD

The present disclosure relates to the communication technology, and more particularly, to a method for periodically acquiring media stream Quality of Service (QoS) and a system thereof.

BACKGROUND

The statements in this section merely provide background information related to the present disclosure and may not constitute prior art.

With the continuous development of communication technology, various services of the Internet, mobile communication network and Public Switched Telephone Network (PSTN) are combining and interoperating with one another so closely that many new services like Internet Protocol (IP) telephone, Wireless Application Protocol (WAP) and video conference appear accordingly. However, as the Internet, the mobile communication network and the PSTN adopt different network structures, the processing procedure of the above-mentioned new services cannot be adopted to completely combine all services of the three networks, rather that a brand new processing mechanism is needed. As a new type of network, Next Generation Network (NGN) can completely fuse services like voice, data, fax and video, so that various services of the Internet, the mobile communication network and the PSTN can intercommunicate with one another at the network layer. Thus the NGN has become the tendency of network combination.

The core idea of the NGN is to separate the media from the service as well as separate the media from the control. In other words, the media transport is independent of the service type and service control. The service bearer is independent of the network form and the user terminal type. The user can configure and define the service characteristics according to the user's own request in order to satisfy the user's various requirements. The NGN includes four layers of functionality: access layer, transport and media layer, control layer and application layer.

The application layer is used to access various services of the user and can connect to high-rate transport line upwards while support multiple service interfaces downwards. The transport and media layer provides a broadband uniform platform with QoS guarantee. The control layer is the control center of the NGN network with interface developing capability and is used for performing functions like control, management, connection, routing, charging, authentication, etc. The service layer is the access platform for developing integrated services and provides various value-added services, multimedia services, third-part services and so on.

In the NGN, the core part is the control layer that adopts the softswitch technology to provide call control functions and connection control functions for the NGN services with real-time requirement. The softswitch technology only switches the transport layer address in the network of the caller and that of the callee through the system, rather than requesting any circuit switching unit to establish any peer-to-peer connection. Therefore, as long as the addresses of the caller and the callee are given, corresponding processes can be performed in fixed forms. The processes are independent of specific service types, thus service transport and service type are separated from each other.

Simplified network structure of NGN is mainly composed of three parts: a Media Gateway (MG), a Media Gateway Controller (MGC) and a Signal Gateway (SG). The MG takes charge of service bearer function and is used for media stream exchange and path connections among different networks. That is, the MG is used for operations on the demand of media stream exchange and processing in the MG, such as path connection between PSTN and the Internet, or path connection between the mobile communication network and the Internet, etc. As the start point and end point of signaling messages, the MGC takes charge in call control, commands availability of each resource and controls the MG connection establishment and release according to the received signaling. Moreover, the MGC can control the whole network via various protocols. The SG is used for transferring different signals. Besides their respective functions, the MGC and the MG also cooperate with each other to separate call control plane from service bearer plane, thereby fully sharing the network resources and simplifying equipment update and service expansion. In this way, development and maintenance cost can be greatly reduced and the network bottleneck due to over centralized functions is avoided. The protocol between MGC and the MG becomes external open protocols from inner-protocols between the MGC and the MG, which leads to convenient product interaction among different manufactures.

At present, the communication protocols adopted between the MGC and the MG are usually the Gateway Control Protocol (H.248/MeGaCo) and the Media Gateway Control Protocol (MGCP). Those skilled in the art should understand that the MGCP is a protocol based on the User Datagram Protocol (UDP) transport while the H.248/MeGaCo is a protocol based on the Transport Control Protocol (TCP) and the UDP transport. The H.248 adopts text coding and binary coding while the MGCP adopts text coding.

Figure 1:
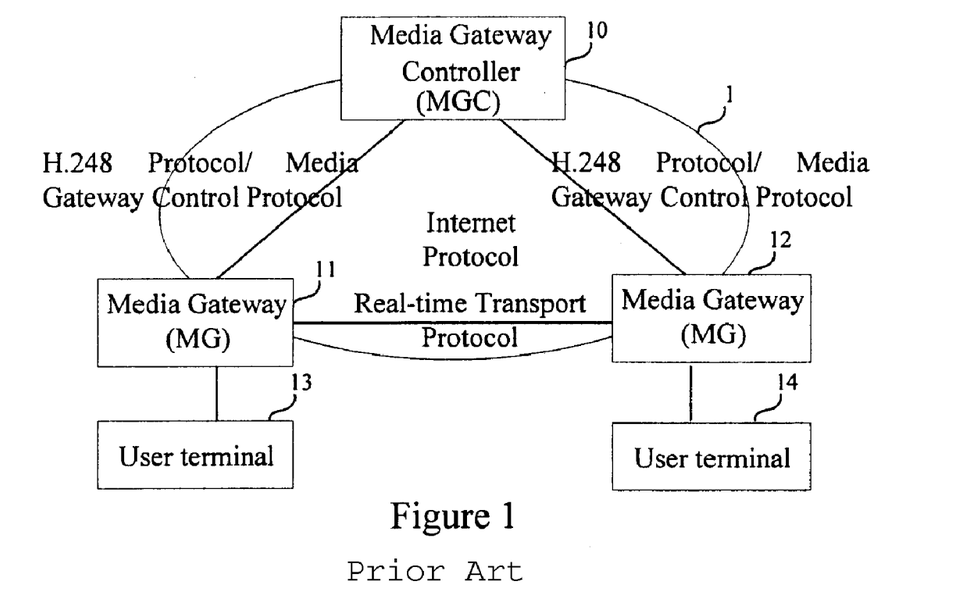
FIG. 1 is a schematic diagram illustrating the network structure of MGs and an MGC in the NGN network structure.

The network framework of the MG and the MGC in the NGN network are shown in FIG. 1. As shown in FIG. 1, protocol network 1 is the network for the transport of all protocols. MGC 10 and MG 11 communicate with each other through H.248/MeGaCo while MGC 10 and MG 12 communicate with each other through H.248/MeGaCo. MG 11 and MG 12 establish a connection through the Real-time Transport Protocol (RTP) under the control of MG 10. The Internet Protocol (IP) bears the MGCP and the RTP to transport the MGCP and the RTP in the protocol network 1. User terminal 13 accesses the protocol network 1 through MG 11 and user terminal 14 accesses the protocol network 1 through MG 12. The interaction between user terminal 13 and user terminal 14 is implemented through various equipments and protocols among the equipments in the protocol network 1.

The MGCP is the main protocol to implement the communication between the MG and the MGC. At present, the most widely applied protocols are H.248/MeGaCo and the MGCP. H.248/MeGaCo was specified in November 2000 and edited in June 2003 by Internet Engineering Task Force (IETF) and International Telecommunication Union (ITU) together. The MGCP was specified in October 1999 and edited in January 2003 by IETF. Taking H.248 for instance, various resources in MG 11 and MG 12 shown in FIG. 1 are abstracted as terminations in H.248. The termination is a logical entity in the MG and for receiving and initiating the media streams. The terminations include physical terminations and ephemeral terminations. The physical termination represents a semi-permanent existent physical entity, such as a Time Division Multiplex (TDM) channel, etc. The ephemeral termination represents the public resources that are applied temporarily and released after being used. The ephemeral termination, such as the RTP, etc, exists only when the call or media stream holds. The combination of terminations or that of the endpoints is abstracted as the Context in H.248 protocol. Many terminations associate with each other as a Context in order to establish a media switch channel. The Context may include multiple terminations, so the Topology is employed to describe the interrelation between the terminations.

Based on the abstract model of H.248 protocol, call relay is actually the operation on the terminations and the contexts. This operation is implemented by the Command request and Command response between the MGC and the MG. The parameters carried by the Command are termed Descriptors and include types of Property, Signal, Event, Statistics, etc. Parameters with service relativity are logically aggregated into a Package. Defining the concept of the Package is the characteristic of H.248. If new service demand and other new demands appear, only a new Package needs to be defined to comprise the extended parameters which can be modified and queried by the MGC using the Commands. H.248 can be extended by using the Packages thereby greatly enhancing the flexibility of H.248. The definition of Package includes six parts: package, property, event, signal, statistics and using procedures related to the package. Under the control of the MGC, as shown in FIG. 1, the RTP media stream established between MGs are bore over the IP network, namely the RTP media stream is transferred on the protocol network 1 through the IP protocol. The RTP media stream can be encoded in different manners, such as G.711, G.723, G.729, T.38, etc, while different coding manners occupy different bandwidths. As the IP bearer network status e.g. network delay, packets loss rate, etc, greatly affects the Quality of Service (QoS) of the media stream, e.g. the voice quality, fax completing rate, etc, it is necessary for the MGC to learn the QoS status of media streams between the MGs such that a macro evaluation of the network service quality can be given or the call control strategy can be dynamically adjusted by, e.g. changing the coding manner, etc.

Figure 2:
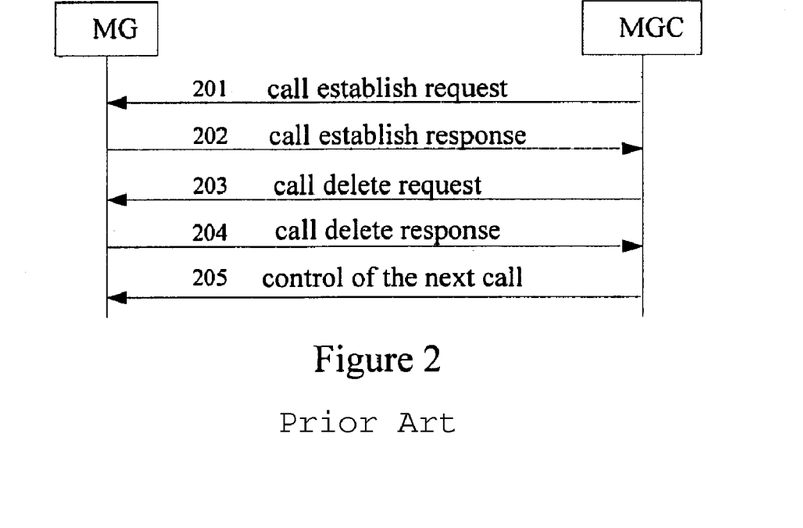
FIG. 2 is a flowchart illustrating the MGC acquiring the QoS of the media stream between the MGs according to the related art.

H248/MeGaCo has added many annexes to RFC3525 protocol, wherein annex E, F, G, J and K have extensively defined a large amount of packages. H.248/MeGaCo defines two packages: Network and RTP in the basic package of the annex E. The media streams QoS, including the Octets Sent, Octets Received, the Packets Sent, Packets Received, the Packets Loss, the network delay, etc between MGs, may be reflected by the statistic parameters in the two packages. With reference to FIG. 2, how the MGC acquires the QoS of the media streams between the MGs in the related art will be illustrated hereinafter.

As shown in FIG. 2, the MG and the MGC respectively represent the controlled part and the controlling part of the call.

Step 201: The MGC sends a call create request towards the MG and requests to create a call.

Step 202: Upon receiving the call create request, the MG responds to the current call create request and returns a call create response to the MGC.

Step 203: When the current call is completed, the MGC sends a call delete request to the MG.

Step 204: Upon receiving the call delete request, the MG responds to the current call delete request and returns a call delete response to the MGC. This call delete response carries the media stream QoS status, including statistic parameters such as the Octets Sent, Octets Received, the Packets Sent, Packets Received, the Packets Loss, the network delay, etc between MGs. The media stream QoS status is in the Network package or the RTP package and relates to the current call.

Step 205: Upon receiving the call delete response, the MGC acquires the QoS of the media streams between MGs through the statistic parameters carried in the call delete response, gives the macro evaluation according to the network QoS and adjusts the corresponding strategy when sending the next call control to the MG.

It can be seen from the above description, in the above-mentioned solution, the MG does not submit the statistic parameter of this call's media stream QoS until the call is ended, without taking the real-time quality of call control strategy adjustment fully into consideration. Therefore, the related art has a poor real-time quality in terms of call control strategy adjustment and cannot adjust the QoS of the media stream that is being transmitted. The MGC is unable to adjust the QoS of every call in time. In other words, even if the MGC knows the QoS status of this call's media stream, it can only influence the procedure of adjusting subsequent call control strategy, which is meaningless to the already ended call.

In practical network applications, as the NGN is based on the IP bearer network, QoS of pure IP technology is not specified only on the telecommunication-level command. For instance, in the NGN, the voice signal is bore through IP technology. As the voice signal is highly sensitive to the time delay, it requires a short network delay during each talk procedure. If congestion happens to the network during a certain call procedure, in the related art, the MGC cannot acquire the bad QoS status of this call's media stream nor adjust the subsequent call control strategy until the user hangs up to end the current call and the MG submits the QoS statistic parameters of this call's media stream. For example, in case of network congestion, the MGC can control the number of successful call connections or utilize a voice coding/encoding algorithm that requires low bandwidth and so on, but the MGC cannot make up for the loss happened during the previous call procedure. With respect to the related art, the scheme of the related art is more applicable to evaluate the macro QoS of the network during a certain period of time, but cannot readily adjust the QoS of each call.

SUMMARY

The embodiments of the present invention provide a method and a system for periodically acquiring the QoS of the media stream to enhance the capability of adjusting the micro QoS of each call.

The method for periodically acquiring the QoS of media stream in accordance with an embodiment of the present invention includes: acquiring QoS information of a media stream and recording the QoS information by a Media Gateway (MG) upon the media stream being activated; setting an inspect duration and a submission period, by a Media Gateway Controller (MGC); and the MGC acquiring the QoS information of the media stream recorded and submitted by the MG, in each submission period of the inspect duration.

According to the method of the embodiments of the present invention, the MGC sets the inspect duration, during which the MGC periodically acquires the QoS information of the media stream so that the MGC can timely acquire the QoS information of the media stream and effectively control the media stream. The embodiment of the present invention provides two ways for the MGC to acquire the QoS information of the media stream periodically. The MG actively submits the QoS information to the MGC periodically or the MG submits the QoS information to the MGC according to the periodical requests of the MGC.

When the MG actively submits the QoS information to the MGC periodically, on one hand, the QoS periodic report package is defined by taking use of the characteristic that H.248 protocol can define new packages according to new service's requirement and other new requirements. The QoS periodic report package includes the extended events that are in favor of improving the real-time quality of the call control strategy adjustment. The extended events include QoS report event as well as corresponding observed event. The QoS periodic report package includes the parameters comprised by the event, e.g. inspect duration, report period, etc. The QoS periodic report package also includes the parameters comprised by the observed event, e.g. Duration Activated, Octets Sent, Octets Received, Packages Sent, Packages Received, Packets Loss, the average value, maximum value and minimum value of the packets loss rate, jitter and delay,, etc. On the other hand, a mechanism for extension of the periodical submission of the media stream QoS is put forward to implement the real-time quality of the control strategy adjustment. In this mechanism, upon the activation of the media stream, the MG acquires and performs the statistics on the QoS information of the media stream according to the RTCP information sampling period, and periodically performs the statistics on and submits the QoS information after receiving the media stream QoS report request sent by the MGC. Moreover, the trigger timing of the initial report and the last report may be subscribed so as to decide whether the analysis of statistic information during the unfixed duration should be supported.

When the MG submits the QoS information to the MGC according to the periodical request of the MGC, during the transmission procedure of the media stream, the MGC sends a media stream QoS audit request to the MG in a fixed period to acquire the current QoS information of the media stream, rather than acquire the QoS information of the media stream only when the MGC has deleted the media stream. Thus this has better real-time quality and is convenient for timely adjusting the media stream transmission. In addition, the H.248 may be extended such that the user can define the QoS parameters of current media stream according to the requirements.

Due to the technical solution described above, the present invention provides the ability of adjusting the call QoS, thus improving the real-time quality of evaluating the QoS and dynamically adjusting the call control strategy. Meanwhile, the ability of evaluating the network's macro QoS in a certain period in the original protocol is inherited to provide more accurate evaluation. For example, according to the present invention, the voice service that is highly sensitive to delay can be well transmitted in the IP network, Other services with high QoS requirement can also be guaranteed to be well transmitted in the IP network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The embodiments of the present invention are described in detail in conjunction with the drawings.

In an embodiment of the present invention, the MGC sets an inspect duration, during which the MGC periodically acquires the QoS information of the media stream, so that the MGC can acquire the QoS information of the media stream in time and effectively control the media stream. Two ways for the MGC to periodically acquire the QoS information of the media stream are provided in the embodiment of the present invention, one is the MG actively submits the QoS information to the MGC periodically, and the other is the MG submits the QoS information to the MGC according to the periodical request of the MGC.

In case of the MG actively submitting the QoS information to the MGC periodically, by extending a mechanism of periodically submitting the media stream QoS, the adjustment of real-time quality of the control strategy may be implemented. Specifically, when the media stream is activated, the MG acquires various QoS information of the media stream in the network periodically through the RTCP and then packs the QoS information into a QoS periodic report package. The QoS report package is triggered when the MGC sends a media stream QoS report request to an ephemeral termination in the MG that receives and transmits this media stream. The MG responds to the media stream QoS report request. During each report period within the inspect duration, the MG calculates the Duration Activated from the report time and then submits the Duration Activated together with the QoS periodic report package within current report period to the MGC. The QoS periodic report package includes various QoS information of the ephemeral termination that receives and transmits this media stream. In terms of the submission mechanism, the inspect duration needs to be longer than or equal to the report period while the report period needs to be longer than or equal to the RTCP information sampling period.

Generally, in terms of the mechanism for extension of the periodical submission of the media stream QoS, according to the post-initialization status and in each report period, the MG samples the media stream at each RTCP information sampling time, accumulates Octets Sent, Octets Received, Packets Sent, Packets Received and Packets Loss at every sampling time, and recalculates the average value, maximum value and minimum value of the packets loss rate, jitter and delay. The MG integrates the above-mentioned QoS information into a QoS periodic report package and records it in the ephemeral termination that receives and sends this media stream. When it is the report time, namely when the submission mechanism is triggered, the MG should submit the information already recorded in the ephemeral termination to the MGC, wherein the Duration Activated parameter is the difference between the current system time stamp and the activated time of the media stream while other parameters are the current values recorded in the ephemeral termination. The MG should clear the average value, maximum value and minimum value of the packets loss rate, jitter and delay after submitting the recorded information, for preparing for the next report period.

In the embodiment of the present invention, by using the characteristics that the H.248 protocol can define new packages according to the demand of the new services and other new demands, the QoS periodic report package is defined. The various extended parameters that are in favor of improving the real-time quality of the control strategy adjustment are contained in the QoS periodic report package such that the MG actively submitting the QoS information to the MGC periodically is implemented.

The procedure of implementing the submission mechanism of the media stream QoS will be further illustrated in detail hereinafter with reference to FIG. 3.

Figure 3:
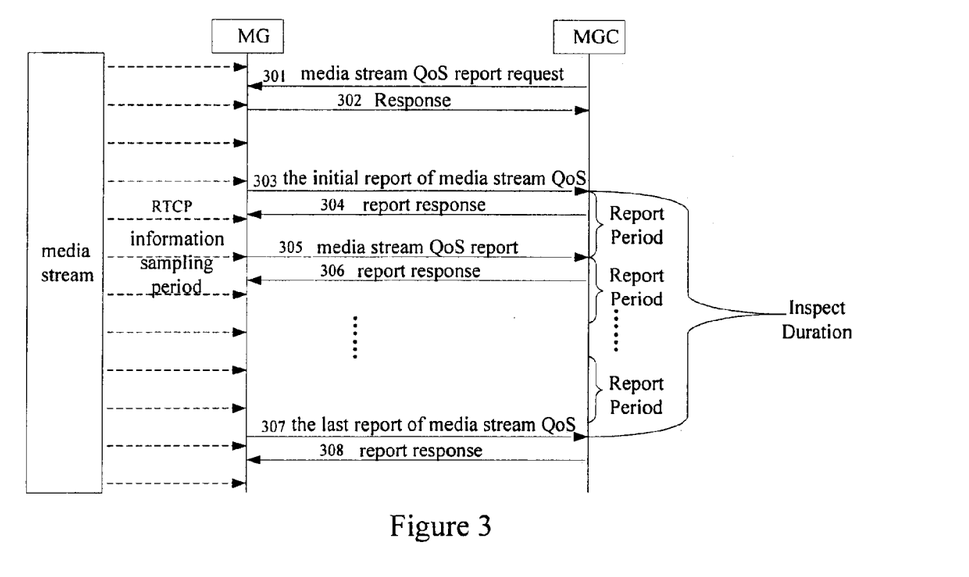
FIG. 3 is a flowchart illustrating the MG actively submitting the QoS information to the MGC periodically according to an embodiment of the present invention.

As shown in FIG. 3, the MG and the MGC are the two ends of the extended media stream QoS submission data stream of the H.248 protocol, wherein the media stream is the media data stream transferred between the MGs.

Firstly, the procedure of initializing the extended submission mechanism of the media stream QoS is performed. Specifically, when activating a certain media stream, namely when setting the media stream as receivable or transmittable, the MG takes the current system time stamp as the activated time of this media stream, in which case the QoS information of the media stream transmitted between the MGs can be acquired. Along with the activation of the media stream, the MG starts a collection of the QoS information to acquire various QoS information of the media stream and record the acquired information in the ephemeral termination that receives and transmits this media stream. Those skilled in the art should understand that RTP stream is one of such ephemeral terminations.

As shown in FIG. 3, the dotted arrow sets between the media stream and the MG stands for the procedure of the MG acquiring various QoS information of the media stream periodically via the RTCP. The MG records the acquired various QoS information of the media stream in the ephemeral termination that receives and transmits this media stream. These QoS information recorded in the ephemeral termination include the Octets Sent, Octets Received, Packets Sent, Packets Received, Packets Loss, current packets loss rate, current jitter, current delay, etc of the media stream periodically acquired via the RTCP. Meanwhile, upon acquiring this above-mentioned information, the MG also acquires the average value, maximum value and minimum value of the packets loss rate, that of jitter and that of delay by calculation. Such information, which may also become a part of the QoS information, may also constitute a QoS periodic report package, which is submitted to the MGC by the MG as soon as the submission mechanism is triggered.

Upon initializing the extended media stream QoS submission mechanism of the MG, a trigger mechanism is needed to start the submission. That is, the MGC sends a media stream QoS report request to the ephemeral termination in the MG that receives and transmits this media stream.

As shown in FIG. 3:

Step 301: When the MGC wants to learn the QoS status of a certain media stream in the MG, it sends a media stream QoS report request to the MG. Specifically, the MGC sends a media stream QoS report request to an ephemeral termination that receives and transmits this media stream in the MG. The MGC sets a duration during which the MG is demanded to submit the QoS information, and this duration may be called an inspect duration. The MGC also needs to set a report period in which the MG is demanded to submit the media stream QoS. Thus, the media stream QoS report request carries the inspect duration and the report period, which are bore by a QoS report event so the media stream QoS report request is marked by the QoS report event.

Step 302: Upon receiving the media stream QoS report request sent by the MGC, according to the inspect duration and the report period carried in the media stream QoS report request, the MG sets up the inspect duration and the report period of this media stream QoS and returns a response to the MGC to inform the MGC of the receipt of the media stream QoS report request.

Afterwards, according to the media stream QoS report request, during every report period of the inspect duration, the MG calculates the Duration Activated at the report time and then submits the calculated Duration Activated together with the QoS information recorded in the ephemeral termination that receives and transmits this media stream within the current period to the MGC.

The basic information contained in the QoS periodic report package submitted to the MGC by the MG includes the Duration Activated, Octets Sent, Octets Received, Packets Sent, Packets Received, Packets Loss, the average of the packets loss rate, the average of jitter and the average of delay. If the MGC needs to acquire more detailed information related to the media stream, it can demand that the QoS periodic report package submitted by the MG includes more parameter information, namely selecting part of or all the parameters in the data-set composed by the Maximum Packets Loss Rate, Minimum Packets Loss Rate, Maximum jitter, Minimum jitter, Maximum delay and Minimum delay to submit.

Detailed description corresponding to FIG. 3 is as follows:

Step 303: Upon receiving the media stream QoS report request sent by the MGC, the MG starts to time the inspect duration and the report period. Meanwhile, the initial media stream QoS report may be triggered immediately and the initial media stream QoS report as well as the calculated media stream Duration Activated may be sent towards the MGC. The initial media stream QoS report carries the QoS information already collected by the MG and thus the QoS information already recorded in the ephemeral termination receiving and transmitting this media stream before the initial report period can be submitted to the MGC by the MG.

It should be noted that, when the MG receives the media stream QoS report request sent by the MGC at first, it is optional to start a media stream QoS report immediately as the initial report. In other words, it is applicable to immediately start the media stream QoS report and submit it to the MGC, or to start the submission normally when the report period is ended. However, it is also feasible not to submit the QoS information already recorded in the ephemeral termination before the initial report period to the MGC. As the information recorded before the initial report period is statistic information in a non-fixed duration, it is more complicated for the MGC to analyze and process. When the QoS information of the media stream during the inspect duration is not needed to be exactly accurate, and in order to decrease the load of the MGC, it is applicable to neglect the statistic information during the non-fixed duration.

Step 304: Upon receiving the initial media stream QoS report submitted by the MG, the MGC returns a report response to the MG to inform the MG of the receipt of the initial media stream QoS report. Upon receipt of the initial media stream QoS report submitted by the MG, the MGC controls the transmission of the media stream according to the received media stream QoS.

Step 305: When the current report period is over, i.e. the next report period starts, the MG starts to time another report period again and sends the media stream QoS report as well as the calculated media stream Duration Activated to the MGC. The media stream QoS report carries the QoS information of the media stream collected by the MG in the previous report period. Upon submitting the QoS information of the media stream to the MGC, the MG clears the QoS information of the media stream indicating the media stream QoS during the previous report period, re-calculates the average value, maximum value and minimum value of the packets loss rate, jitter and delay, and records the average value, maximum value and minimum value of the packets loss rate, jitter and delay in the ephemeral termination that receives and transmits this media stream as a part of the QoS information.

Step 305 is a submission procedure of the QoS information of the media stream. The submission-trigger mechanism of the QoS information of the media stream is defined by the report period duration whose value is decided by the report period carried in the media stream QoS report request sent to the MG by the MGC. When the report period is over, the MG submits the QoS information of the media stream to the MGC and starts to time the next report period duration at the same time.

Step 306: Upon receiving the media stream QoS report submitted by the MG, the MGC returns a response to the MG and informs the MG of the receipt of the report associated to the media stream QoS. Upon receiving the media stream QoS report submitted by the MG, the MGC controls the transmission of the media stream according to the received QoS information of the media stream.

A report period is performed from step 303 to step 305. During each report period, the MG recalculates the average value, maximum value and minimum value of the packets loss rate, jitter and delay, which are taken as a part of the QoS information and recorded in the ephemeral termination that receives and transmits this media stream in the MG. When the current report period is over, i.e. the next report period starts, upon submitting this QoS information to the MGC, the MG clears the record of average value, maximum value and minimum value of the packets loss rate, jitter and delay, which are only valid during the previous report period.

During the subsequent processing procedure within the inspect duration, step 305 and step 306 are repeatedly executed in each report period.

Step 307: When the inspect duration is over, or when the media stream is deactivated before the inspect duration is over, the MG may immediately start the last media stream QoS report, submits the QoS information of the media stream in the pending report period that is recorded in the ephemeral termination and then ends the detection. The trigger mechanism of the last media stream QoS report is that the inspect duration is over or when this media stream is deactivated before the inspect duration is over.

It should be noted that, when the set inspect duration is over, or if the media stream is deactivated before the inspect duration is over, it is optional for the MG to immediately start the last media stream QoS report as the final report. If the MG does not immediately start the last media stream QoS report at the moment, the information recorded during the pending report period when the inspect duration is over, or the information recorded during the pending report period when the media stream is deactivated before the inspect duration is over, may not be submitted to the MGC. Analogously, when considering alleviating the load of the MGC and when the QoS information of the media stream during the inspect duration is not demanded to be exactly accurate, theses pieces of statistic information during the un-fixed duration can be ignored.

Step 308: Upon receiving the final report of the media stream QoS submitted by the MG, the MGC returns a report response to the MG and informs the MG that the last report of the media stream QoS is received.

Finally, the MG needs to clear the records of the average value, maximum value and minimum value of the packets loss rate, jitter and delay, which are related to the current extended media stream QoS submission procedure.

It should be noted that, the inspect duration in FIG. 3 includes three report periods. In actual applications, the inspect duration may include one report period at least.

It can be seen from the above description, in the MG, upon receiving the media stream QoS report request sent by the MGC as well as other parameters like inspect duration and report period, according to which the MG sets up the inspect duration and report period of this media stream QoS. And the MG clears the records of the average value, maximum value and minimum value of the packets loss rate, jitter and delay, which are only valid during a single report period.

In the MGC, the MGC should not transmit the media stream QoS report request to the MG until the media stream is activated. Moreover, before the detection is over, this media stream QoS report request is kept valid all the time in the corresponding ephemeral termination. Upon transmitting the media stream QoS report request to the MG, as to the QoS information submitted by the MG each time, the MGC extracts the Duration Activated parameter as the time shift of the current report with respect to the time that the media stream is activated. The MGC extracts the Octets Sent, Octets Received, Packets Sent, Packets Received and Packets Loss that are then taken as the aggregated amount. The difference between corresponding parameters of the previous media stream QoS report and the aggregated amount can be calculated to acquire the state of the current report period. And the MGC extracts the average value, maximum value and minimum value of the packets loss rate, jitter and delay, which are taken as the status of the current report period. Accordingly, the MGC can further analyze various indexes of the media stream QoS and then plot various curve diagrams illustrating the tendency of the QoS. It can be seen from the above analysis that, in this embodiment, the MGC can evaluate the media stream QoS within every report period during a calling procedure and dynamically adjust the call control strategy. Thus the MGC has a good ability of adjusting the micro QoS of every call, rather than evaluate the media stream QoS or dynamically adjust the call control strategy after the call is over, thereby improving the real-time quality. Meanwhile, sufficient QoS information of the media stream can make the evaluation upon the network's macro QoS more accurate during a certain period.

In addition, the RTCP information sampling period is adjustable. If the RTCP information sampling period is close to or equal to a period of submitting the QoS information by the MG to the MGC the content of the reported QoS information is the content of the latest sampled RTCP information.

In the preferred embodiments of the invention, according to the specification of H.248 protocol, with reference to the form of the large amount of already extended package definitions in Request for Comment (RFC) 3525 protocol affix, new QoS periodic report package is defined according to the new demand of increasing the real-time quality of call control strategy adjustment. This QoS periodic report package includes various QoS information of the media stream. These solutions would like to receive recognition of Internet Assigned Number Authority (IANA) for adding the new QoS periodic report package to the H248 protocol clusters.

H.248 protocol is extended as follows according to the preferred embodiments of the present invention.

QoS periodic report package
Package ID: media stream QoS report request, 0x????
Version: 1
Extends: None
Description: Defines the items and mechanism of the QoS information of the media stream periodically submitted.
1. Properties
None
2. Events
QoS Report
Event ID: QoS request, 0x0001
Description: This event is used by the MGC to indicate the MG to detect and submit the QoS information of the media stream.
2.1 Events Descriptor Parameters
2.1.1. Inspect Duration
Parameter ID: id (0x0001)
Type: integer, in second
Possible Values: any 32-bit positive integer
Description: Defines the duration of detecting the QoS information of the media stream.
2.1.2. Report Period
Parameter ID: rp (0x0002)
Type: integer, in second
Possible Values: any 32-bit positive integer
Description: Defines the period for submitting QoS information of the media stream.
2.2 Observed Events Descriptor Parameters
2.2.1. Duration Activated
Parameter ID: da (0x0001)
Type: Double, in millisecond
Possible Values: any 64-bit nonnegative integer
Description: Defines the duration during which the media stream is activated as receivable or transmittable.
2.2.2. Octets Sent
Parameter ID: os (0x0002)
Type: Double
Possible Values: any 64-bit nonnegative integer
Description: Defines the aggravated total number of the already sent octets of the media stream.
2.2.3. Octets Received
Parameter ID: or (0x0003)
Type: Double
Possible Values: any 64-bit nonnegative integer
Description: Defines the aggravated total number of the already received octets of the media stream.
2.2.4. Packets Sent
Parameter ID: ps (0x0004)
Type: Double
Possible Values: any 64-bit nonnegative integer
Description: Defines the aggravated total number of the already sent packets of the media stream.
2.2.5. Packets Received
Parameter ID: pr (0x0005)
Type: Double
Possible Values: any 64-bit nonnegative integer
Description: Defines the aggravated total number of the already received packets of the media stream.
2.2.6. Packets Loss
Parameter ID: pi (0x0006)
Type: Double
Possible Values: any 64-bit nonnegative integer
Description: Defines the aggravated total number of the already lost packets of the media stream.
2.2.7. Average Packets Loss Rate
Parameter ID: aveplr (0x0007)
Type: Double, in %
Possible Values: 32-bit integer and 32-bit decimal fraction
Description: Defines the average packets loss rate of the media stream during the current report period
2.2.8. Maximum Packets Loss Rate
Parameter ID: maxplr (0x0008)
Type: Double, in %
Possible Values: 32-bit integer and 32-bit decimal fraction
Description: Defines the maximum packets loss rate of the media stream during the current report period
2.2.9. Minimum Packets Loss Rate
Parameter ID: minpir (0x0009)
Type: Double, in %
Possible Values: 32-bit integer and 32-bit decimal fraction
Description: Defines the minimum packets loss rate of the media stream during the current report period
2.2.10. Average Jitter
Parameter ID: avej (0x000a)
Type: integer
Possible Values: any 32-bit nonnegative integer
Description: Defines the average jitter of the media stream during the current report period
2.2.11. Maximum Jitter
Parameter ID: maxj (0x000b)
Type: integer
Possible Values: any 32-bit nonnegative integer
Description: Defines the maximum jitter of the media stream during the current report period
2.2.12. Minimum Jitter
Parameter ID: minj (0x000c)
Type: integer
Possible Values: any 32-bit nonnegative integer
Description: Defines the minimum jitter of the media stream during the current report period
2.2.13. Average Delay
Parameter ID: aved (0x000d)
Type: integer
Possible Values: any 32-bit nonnegative integer
Description: Defines the average delay of the media stream during the current report period
2.2.14. Maximum Delay
Parameter ID: maxd (0x000e)
Type: integer
Possible Values: any 32-bit nonnegative integer Description: Defines the maximum delay of the media stream during the current report period 2.2.15. Minimum Delay
Parameter ID: mind (0×000f)
Type: integer
Possible Values: any 32-bit nonnegative integer
Description: Defines the minimum delay of the media stream during the current report period 3. Signals
None
4. Statistics
None
5. Procedures According to the preferred embodiments of the present invention, five points in the above-defined QoS periodic report package should be specified.

First, in the "Package ID: media stream QoS report request, 0×????", the "0×????" is an undetermined hexadecimal expression, and the specific value of which needs to be uniformly allocated by IANA.

Second, through the parameters 2.1, i.e. Events Descriptor Parameters in the Events, the MGC indicates the MG to inspect the QoS information of the media stream.

Third, through the parameters 2.2, i.e. Observed Events Descriptor Parameters in the Events, the MG submits the QoS information of the media stream to the MGC.

Fourth, the parameters 2.2, i.e. Observed Events Descriptor Parameters in the Events have fifteen properties; nine of the properties are needed to complete a basic QoS submission procedure. The MGC can learn the basic QoS information of the media stream between the MGs according to the nine properties. The nine basic properties are the Duration Activated, the Octets Sent, the Octets Received, the Packets Sent, the Packets Received, the Packets Loss, the Package Loss Rate, the Average Package Loss Rate, the Average Jitter and the Average Delay. If it is needed to submit greatly detailed QoS information, one of, several of or all of the other six properties of the fifteen properties can be added so that more QoS information can be submitted.

Fifth, the Procedures defined in the package definition mentioned above are the procedure related to the use of the package.

The processes for the MG submitting the QoS information to the MGC according to the periodic request of the MGC will be described as follows. In order to timely acquire the statistic parameters that reflect the current media stream QoS, the transmission of current media stream should be controlled. The MG submits the QoS information to the MGC according to the periodic request of the MGC. Specifically, an audit period and inspect duration may be set in the MGC. During the inspect duration, the MGC periodically and continuously sends the media stream QoS audit request to the ephemeral termination that receives and transmits the current media stream so as to trigger the MG to continuously return the QoS information of this media stream, thereby timely controlling the media stream.

Figure 4A:
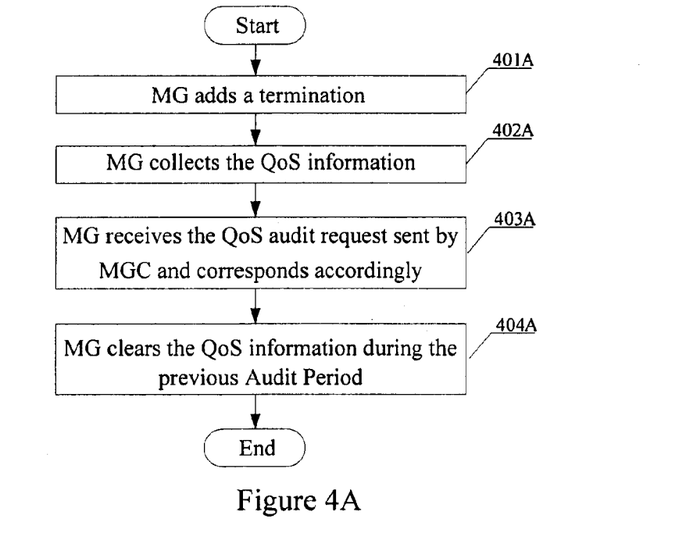
FIG. 4A is a flowchart illustrating the MG submitting the QoS information to the MGC according to the periodic request of the MGC, in the MG side, according to an embodiment of the present invention.

FIG. 4A shows a MG-side flowchart illustrating the MG submitting the QoS information to the MGC according to the periodic request of the MGC according to the embodiment of the present invention. As shown in FIG. 4A, the process at MG side includes the following steps:

Step 401A: Add an ephemeral termination in the MG. The ephemeral termination can be added in the context by using the Add Command of H.248 protocol. The current time may be taken as the activated time of this media stream when adding the ephemeral termination.

Step 402A: The MG starts the mechanism for collecting the QoS information to acquire the QoS information of the current media stream and records the acquired information in the ephemeral termination corresponding to this media stream. The QoS information of current media stream could be acquired within a fixed period through the RTCP. The QoS information is one of or any combination of the Octets Sent, the Octets Received, the Packets Sent, the Packets Received, the Packets Loss, the current Package Loss Rate, the current jitter and the current delay. The Package Loss Rate, Average Jitter and Average Delay can be acquired by the inter-calculation of the MG.

Step 403A: The MG receives the media stream QoS audit request periodically sent by the MGC and responds to this request. That is, according to the statistic parameters carried in the above-mentioned media stream QoS audit request, the MG selects the QoS information of the media stream to be submitted in the ephemeral termination corresponding to this media stream and submits the selected information together with the calculated Duration Activated to the MGC. As the MGC sends the media stream QoS audit request to the MG with a fixed audit period and delays of the media stream QoS audit requests during the audit periods are different along with the different network status, the responses to the media stream QoS audit request from the MG are not returned within a fixed period. Therefore, besides the current QoS information of the media stream, the above-mentioned response should include the Duration Activated. The Duration Activated is the difference between the time when MG submits the QoS information after receiving the media stream QoS audit request and the above-mentioned activated time. The Duration Activated refers to the current Duration Activated of the media stream.

Step 404A: The MG clears the QoS information being only valid for the previous audit period and starts to collect the QoS information during the new audit period. As the MG needs to respond to every received media stream QoS audit request and make sure that current response is for the current audit period, it is necessary for the MG clearing the QoS information that is only valid for the previous audit period after returning the QoS information of the previous audit period to the MGC. Meanwhile, the MG starts to collect the QoS information during the new audit period and records the collected information in the ephemeral termination corresponding to this media stream.

Within each audit period of the inspect duration, the MG executes steps 403A and 404A repeatedly.

The above description is the processing procedure at the MG side when the media stream QoS is being detected periodically according to the embodiment of the present invention. The processing procedure at the MGC side will be described in detail hereinafter.

Figure 4B:
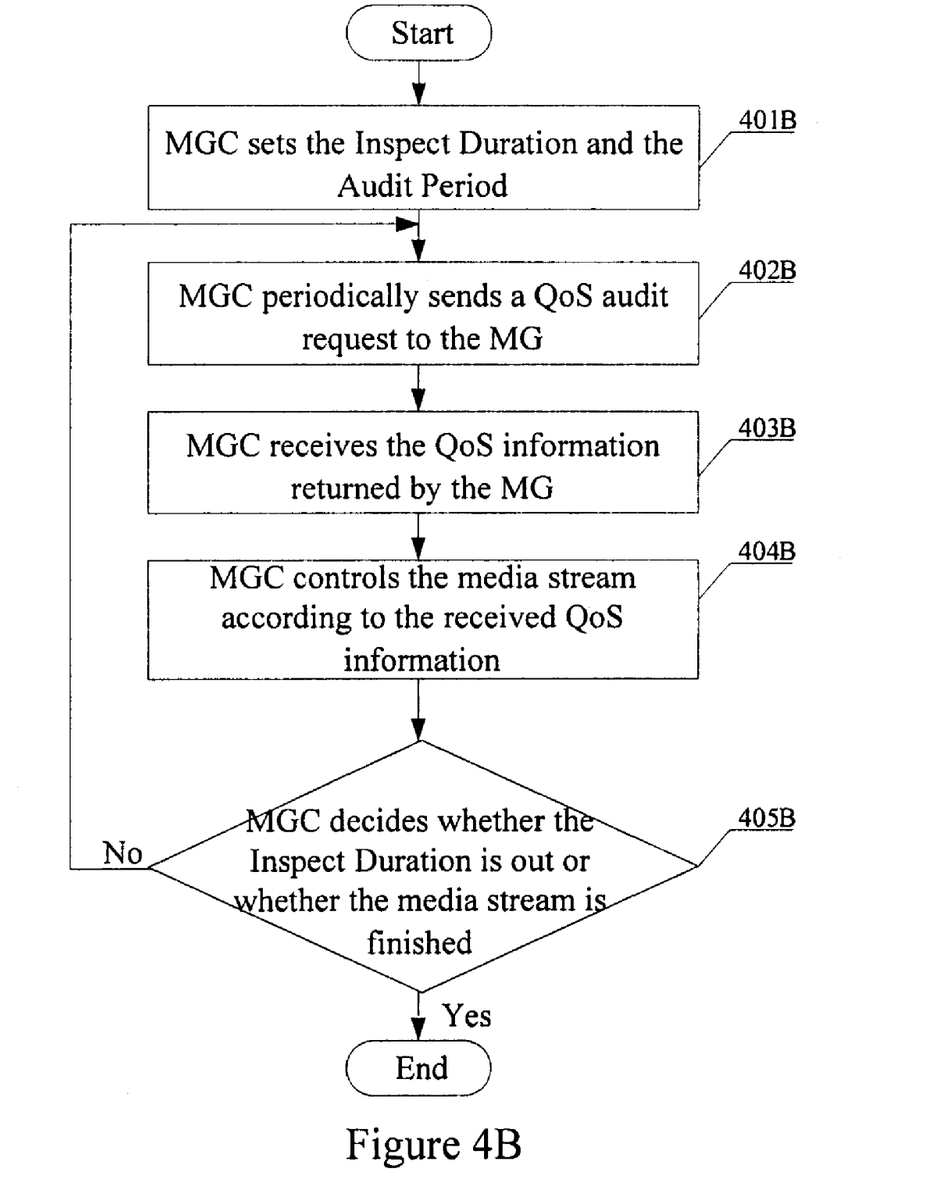
FIG. 4B is a flowchart illustrating the MG submitting the QoS information to the MGC according to the periodic request of the MGC, in the MGC side, according to an embodiment of the present invention.

FIG. 4B shows an MGC-side flowchart illustrating the MG submitting the QoS information to the MGC according to the periodic request of the MGC according to the embodiment of the present invention. As shown in FIG. 4B, the processes at the MGC side include the following steps:

Step 401 B: Upon the MG initiating the mechanism of collecting the QoS information of the media stream, the MGC sets inspect duration and audit period according to the requirements. The value of the inspect duration and the audit period are both positive integers. The inspect duration is longer than or equal to the audit period while the audit period is longer than or equal to the RTCP information sampling period. If the RTCP information sampling period is close to or equal to the audit period, the content of the periodic detection is equal to the content of the latest sampled RTCP information.

Step 402B: The MGC sends a media stream QoS audit request to the MG to inquire the QoS information of the current media stream. Those skilled in the art should know that, the media stream QoS audit request should includes the statistics descriptor for representing the QoS statistic parameters to be returned. In the preferred embodiments of the present invention, the statistic parameters include one of or any combination of the Octets Sent, the Octets Received, the Packets Sent, the Packets Received, the Packets Loss, the current Package Loss Rate, the current jitter and the current delay of the media stream, which are periodically acquired by the MG via the RTCP; as well as one of or any combination of the average value, the maximum value and the minimum value of the packets loss rate, jitter and delay, which are acquired by the MGC through calculation.

Step 403B: The MGC receives the QoS information of the media stream returned by the MG. The MGC may calculate the QoS information of the media stream returned within the current audit period and that returned within the previous audit period to acquire the media stream-related information during the current audit period.

Step 404B: The MGC controls the transmission of this media stream according to the acquired QoS information of the media stream. For instance, if the network bandwidth is not enough, the MGC may adopt a coding manner requiring lower bandwidth to code the media stream. In addition, the MGC may also plot various curve diagrams that reflect the QoS tendency according to the QoS information of the media stream, returned by the MG, during different Duration Activateds.

Step 405B: The MGC decides whether the duration in which the MG is requested to submit the QoS information of the media stream is longer than the inspect duration, or whether the current media stream is over. If the duration in which the MG is requested to report the QoS information of the media stream is longer than the inspect duration or the ephemeral termination that receives and transmits this media stream during the inspect duration has been deleted from the context, the current procedure should be ended. If the Duration Activated has not exceeded the inspect duration yet and the current media stream is not over, step 402B should be re-performed to start the next audit period.

In actual applications, the system may need to know the QoS status before the detection is started. So the initial audit procedure may be started immediately when the detection is started. When the duration in which the MG is requested to report the QoS information of the media stream is longer than the inspect duration or the ephemeral termination that receives and transmits this media stream during the inspect duration has been deleted from the context, the final audit procedure may be initiated to acquire the QoS information of the current media stream in the MG during the pending audit period. The above-mentioned initial audit and final audit are both triggered by adopting un-fixed duration, which needs to add new operation commands and thus the procedure is relatively complicated. For instance, the final audit procedure may be triggered by detecting the inspect duration over command or the media stream delete command. Specifically, MGC can start the initial detection as soon as the inspect duration is timed, and then sends a media stream QoS audit request to the ephemeral termination that receives and transmits this media stream in MG. The ephemeral termination responds to the initial media stream QoS audit request, selects the QoS information that needs to be submitted according to the statistic parameters carried in this media stream QoS audit request and then submits the selected QoS information together with the calculated Duration Activated to the MGC. The MGC may also send the initial media stream QoS audit request to the ephemeral termination that receives and transmits this media stream in the MG after starting the inspect duration and audit period and when the first audit period is over, so that the MG can submit the QoS information of the media stream in the fixed duration to the MGC and ignore the QoS information of the media stream before the inspect duration is started. On the other hand, when the inspect duration is over or the ephemeral termination that receives and transmits this media stream has been deleted or removed out from the context before the inspect duration is over, the MGC starts the final audit immediately and sends the last media stream QoS audit request to the ephemeral termination that receives and transmits this media stream. The ephemeral termination responds to the final media stream QoS audit request, selects the QoS information that needs to be submitted according to the statistic parameters carried in this media stream QoS audit request and then submits the selected QoS information together with the calculated Duration Activated to the MGC. If the MGC does not start the initial audit or the final audit immediately, the QoS information already recorded in the ephemeral termination that receives and transmits this media stream before the initial audit period should not be submitted to the MGC. The information already recorded during the possible pending audit period when the detection is over should not be submitted to the MGC. Meanwhile, the information already recorded during the possible pending audit period when the media stream is deactivated before the detection is ended should not be submitted to MGC either. Considering alleviating the load of the MGC and when the QoS information of the media stream during the inspect duration is not needed to be exactly accurate, theses pieces of statistic information during the un-fixed duration may be ignored.

Figure 5:
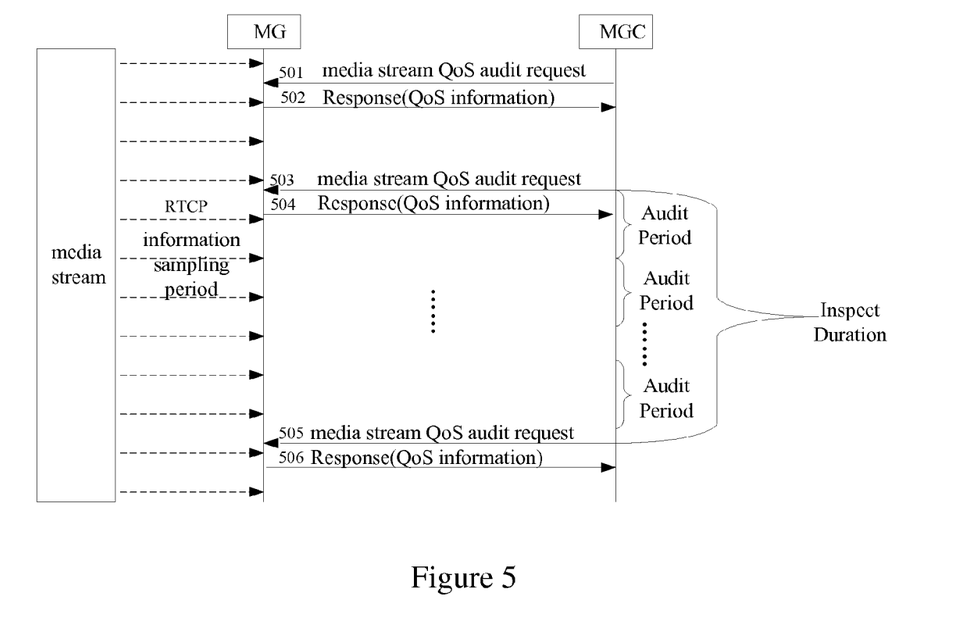
FIG. 5 is a flowchart illustrating the MG submitting the QoS information to the MGC according to the periodic request of the MGC according to an embodiment of the present invention.

FIG. 5 shows a flowchart illustrating the MG submitting the QoS information to the MGC according to the periodic request of the MGC. As shown in FIG. 5, the MG starts the mechanism of collecting the QoS information, acquires the QoS information of the current media stream and then records the information in the ephemeral termination corresponding to this media stream. Upon the MG starting the mechanism of collecting the QoS information, the MGC sets the inspect duration and audit period as required. The procedure of the MG submitting the QoS information to the MGC according to the periodic request of the MGC includes the following steps:

Step 501: When the MGC wants to learn the QoS status of a certain media stream in the MG, it starts to time the inspect duration and the audit period and simultaneity sends a media stream QoS audit request carrying statistic parameters to the MG to inquire the QoS information of current media stream.

Step 502: Upon receiving the media stream QoS report request sent by the MGC, according to the statistic parameters carried in the media stream QoS report request, the MG selects the QoS information of the media stream to be submitted from the information stored in the ephemeral termination corresponding to this media stream, and then submits the selected information together with the calculated Duration Activated to the MGC. Upon submitting the QoS information of the media stream to the MGC, the MG clears the QoS information of the media stream indicating the status of the previous audit period and recalculates the average value, maximum value and minimum value of the Packets Loss, jitter and delay. The result of the calculation are taken as a part of the QoS information and recorded in the ephemeral termination that receives and transmits this media stream in the MG. The MGC can control the transmission of the media stream after receiving the QoS information of the media stream provided by the MG.

Step 503: When the current audit period is over, i.e. the next audit period starts, the MGC starts to time another audit period and simultaneity sends to the MG a media stream QoS audit request which carries statistic parameters for inquiring the QoS information of current media stream.

Step 504: Upon receiving the media stream QoS audit request sent by the MGC, according to the statistic parameters carried in the media stream QoS report request, the MG selects the QoS information of the media stream to be submitted from the information stored in the ephemeral termination corresponding to this media stream, and then submits the selected information together with the calculated Duration Activated to the MGC. Upon submitting the QoS information of the media stream to the MGC, the MG clears the QoS information of the media stream indicating the status of the previous audit period and recalculates the average value, maximum value and minimum value of the Packets Loss, jitter and delay. The result of the calculation are taken as a part of the QoS information and recorded in the ephemeral termination that receives and transmits this media stream in the MG. The MGC can control the transmission of the media stream after receiving the QoS information of the media stream provided by the MG.

An audit period is performed between step 501 and step 503. During each audit period, the MG recalculates the average value, maximum value and minimum value of the packets loss rate, jitter and delay, which are taken as a part of the QoS information and recorded in the ephemeral termination that receives and transmits this media stream in the MG. When the current audit period is over, i.e. the next audit period starts, upon responding to the media stream QoS audit request of the MGC and sending the QoS information to the MGC, the MG clears the record of average value, maximum value and minimum value of the packets loss rate, jitter and delay, which are only valid during the previous audit period.

During the subsequent process in the inspect duration, steps 503 and 504 are repeatedly executed during each audit period.

Step 505: When the inspect duration is over or the media stream is deactivated before the inspect duration is over, the MGC sends to the MG a media stream QoS audit request carrying the statistic parameters to request the MG to provide the QoS information of the media stream for the last time.

Step 506: Upon receiving the media stream QoS audit request sent by the MGC, according to the statistic parameters carried in the media stream QoS audit request, the MG selects the QoS information of the media stream to be submitted from the information stored in the ephemeral termination corresponding to this media stream, and then submits the selected information together with the calculated Duration Activated to the MGC.

As different media stream may demand different QoS, in the original H.248 protocol, the returned QoS information includes the Packets Sent, the Packets Received, the packet loss rate, jitter and delay. In order to perform better monitor on the media stream, the H.248 protocol may be extended. Basic extendable parameters of the H248 protocol will be described in detail hereinafter. These parameters mainly include the Maximum Packets Loss Rate (maxpir), the Minimum Packets Loss Rate (minpir), the Maximum jitter (maxj), the Minimum jitter (minj), the Maximum delay (maxd) and the Minimum delay (mind).

The Maximum Packets Loss Rate is a parameter for defining the maximum packets loss rate of the media stream during the current audit period and the parameter ID thereof is "maxplr" or 0x0009. The value type of the Maximum Packets Loss Rate is Double and the possible value is 32-bit integer or 32-bit fraction.

The Minimum Packets Loss Rate is a parameter for defining the minimum packets loss rate of the media stream during the current audit period and the parameter ID thereof is "minpir" or 0x000a. The value type of the Minimum Packets Loss Rate is Double and the possible value is 32-bit integer or 32-bit fraction.

The Maximum jitter is a parameter for defining the maximum jitter of the media stream during current audit period and the parameter ID thereof is "maxj" or 0x000b. The value type of the Maximum jitter is integer and the possible value is 32-bit nonnegative integer.

The Minimum jitter is a parameter for defining the minimum jitter of the media stream during current audit period and the parameter ID thereof is "minj" or 0x000c. The value type of the Minimum jitter is integer and the possible value is 32-bit nonnegative integer.

The Maximum delay is a parameter for defining the maximum delay of the media stream during current audit period and the parameter ID thereof is "maxd" or 0x000d. The value type of the Maximum delay is integer and the possible value is 32-bit nonnegative integer.

The Minimum delay is a parameter for defining the minimum delay of the media stream during current audit period and the parameter ID thereof is "mind" or 0x000e. The value type of the Minimum delay is integer and the possible value is 32-bit nonnegative integer.

The foregoing are only preferred embodiments of this invention and are not intended to limit this invention. The invention is to cover all the modifications, variations and equivalent replacements within the spirit and scope of the disclosure as defined by the appended claims.

What is claimed is:

1. A method for periodically acquiring Quality of Service (QoS) of media stream, comprising:
   acquiring QoS information of a media stream by a Media Gateway (MG) upon the media stream being activated;
   setting an inspect duration and a submission period, by a Media Gateway Controller (MGC); and
   the MGC acquiring the QoS information of the media stream recorded and submitted by the MG, in each submission period of the inspect duration, wherein the QoS information is selected from a group consisting of an Octets Sent, an Octets Received, a Packets Sent, a Packets Received, a Packets Loss, current jitter, current delay, an average value, a maximum value and a minimum value of packets loss rate, the average value, the maximum value and the minimum value of jitter, and the average value, the maximum value and the minimum value of delay.

2. The method according to claim 1, wherein the submission period is a report period;
   sending the inspect duration and the report period to the MG by the MGC; and
   starting to time the inspect duration and the report period by the MG, and submitting the QoS information of the media stream to the MGC in each report period of the inspect duration.

3. The method according to claim 2, wherein the MG starts to time the inspect duration and the report period upon receiving the inspect duration and the report period set by the MGC.

4. The method according to claim 2, wherein the inspect duration and the report period are carried in a QoS report event that is carried in a media stream QoS report request sent to the MG by the MGC.

5. The method according to claim 2, wherein,
when the MG receives a media stream QoS report request sent by the MGC,
the MG starts to time the inspect duration and a first report period and submits the QoS information of the media stream to the MGC.

6. The method according to claim 2, wherein when the MG receives a media stream QoS report request sent by the MGC,
the MG starts to time the inspect duration and a first report period, and submits the QoS information of the media stream to the MGC when the first report period ends.

7. The method according to claims claim 2, further comprising:
upon the inspect duration being over, or the media stream being deactivated before the inspect duration is over, submitting, by the MG, the QoS information of the media stream during a current pending report period to the MGC.

8. The method according to claim 2, further comprising:
upon the inspect duration being over, or the media stream being deactivated before the inspect duration is over, stopping submitting the QoS information of the media stream to the MGC.

9. The method according to claim 1, wherein the submission period is an audit period,
the MGC starts the inspect duration and the audit period and requests the MG to provide the QoS information of the media stream in each audit period; and
the MG submits the QoS information of the media stream according to the request of the MGC.

10. The method according to claim 9, further comprising:
upon the inspect duration being over, or the media stream being deactivated before the inspect duration is over, the MGC requesting the MG to provide the QoS information of the media stream recorded during the current pending audit period; the MG submitting the QoS information of the media stream recorded during the current pending audit period to the MGC according to the request of the MGC.

11. The method according to claim 9, further comprising:
upon the inspect duration being over, or the media stream being deactivated before the inspect duration is over, stopping requesting the MG to provide the QoS information of the media stream.

12. The method according to claim 9, wherein
when the MGC starts to time the inspect duration and a first audit period, the MGC requests the MG to provide the QoS information of the media stream;
the MG submits the QoS information of the media stream according to the request of the MGC.

13. The method according to claim 9, wherein
the MGC starts to time the inspect duration and a first audit period and requests the MG to provide the QoS information of the media stream when the first audit period ends;
the MG submits the QoS information of the media stream according to the request of the MGC.

14. The method according to claim 1, wherein the MG submits a Duration Activated of the media stream when the MG submits the QoS information of the media stream to the MGC.

15. The method according to claim 14, wherein the Duration Activated is the difference between current time and an activation time of the media stream.

16. The method according to claim 15, wherein the submission period is longer than or equal to an RTCP information collection period.

17. The method according to claim 1, further comprising:
upon submitting the QoS information of the media stream to the MGC in each submission period by the MG, the MG clearing the recorded QoS information of the media stream and recollecting the QoS information of media stream.

18. The method according to claim 1, wherein the inspect duration is longer than or equal to the submission period.

19. A system for periodically acquiring Quality of Service (QoS) of media stream, comprising:
a Media Gateway (MG) and a Media Gateway Controller (MGC); wherein
the MG acquires QoS information of a media stream after the media stream is activated, the MGC sets an inspect duration and a submission period and the MGC acquires the QoS information of the media stream submitted by the MG, in each submission period of the inspect duration;
wherein the MGC further sends the inspect duration and the report period to the MG; and
the MG further starts to time the inspect duration and the report period, and submits the QoS information of the media stream to the MGC in each report period of the inspect duration.

* * * * *